March 6, 1934. J. L. CLEAVER 1,949,783
MENTAL TESTING APPARATUS
Original Filed March 31, 1932  4 Sheets-Sheet 1
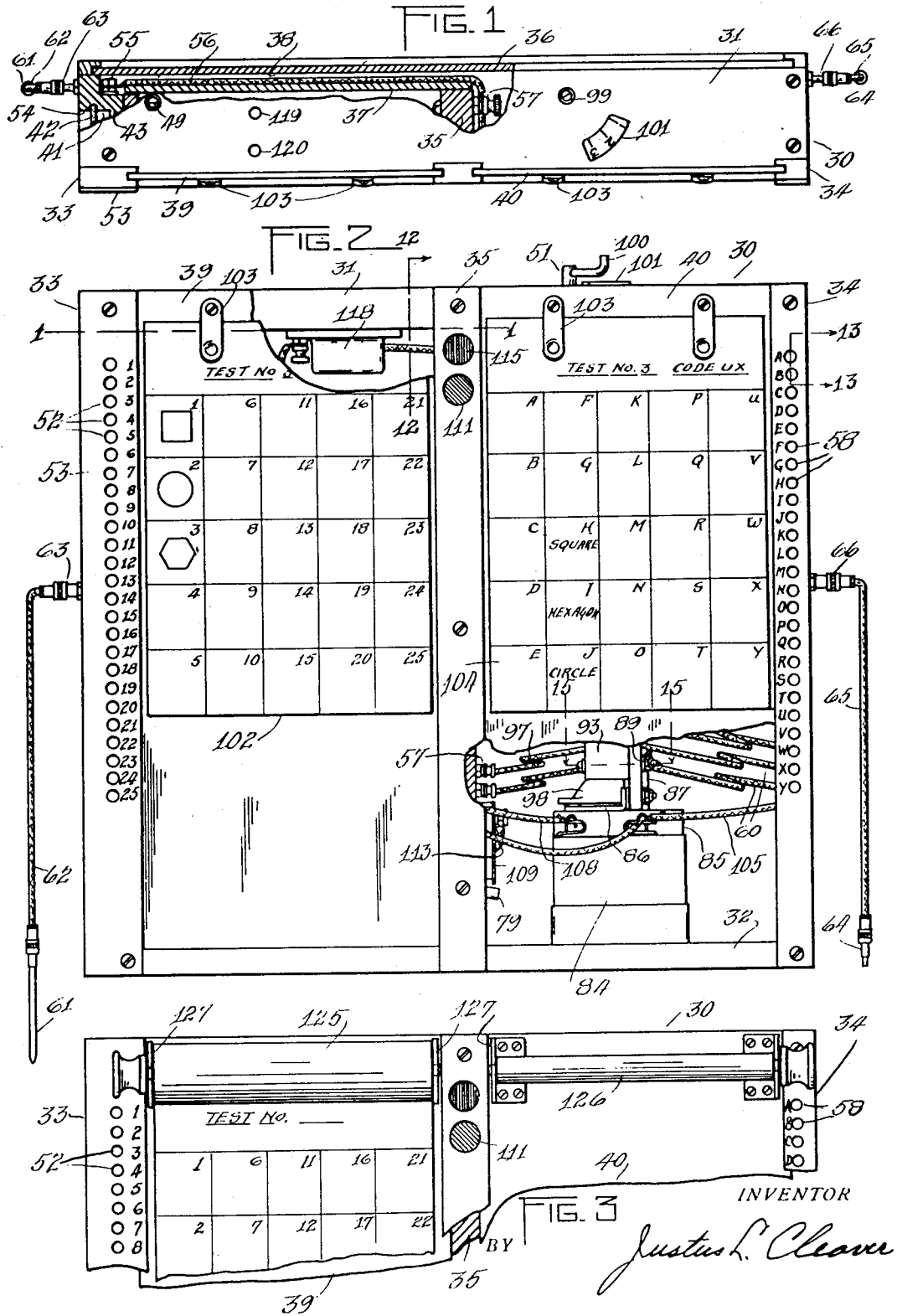

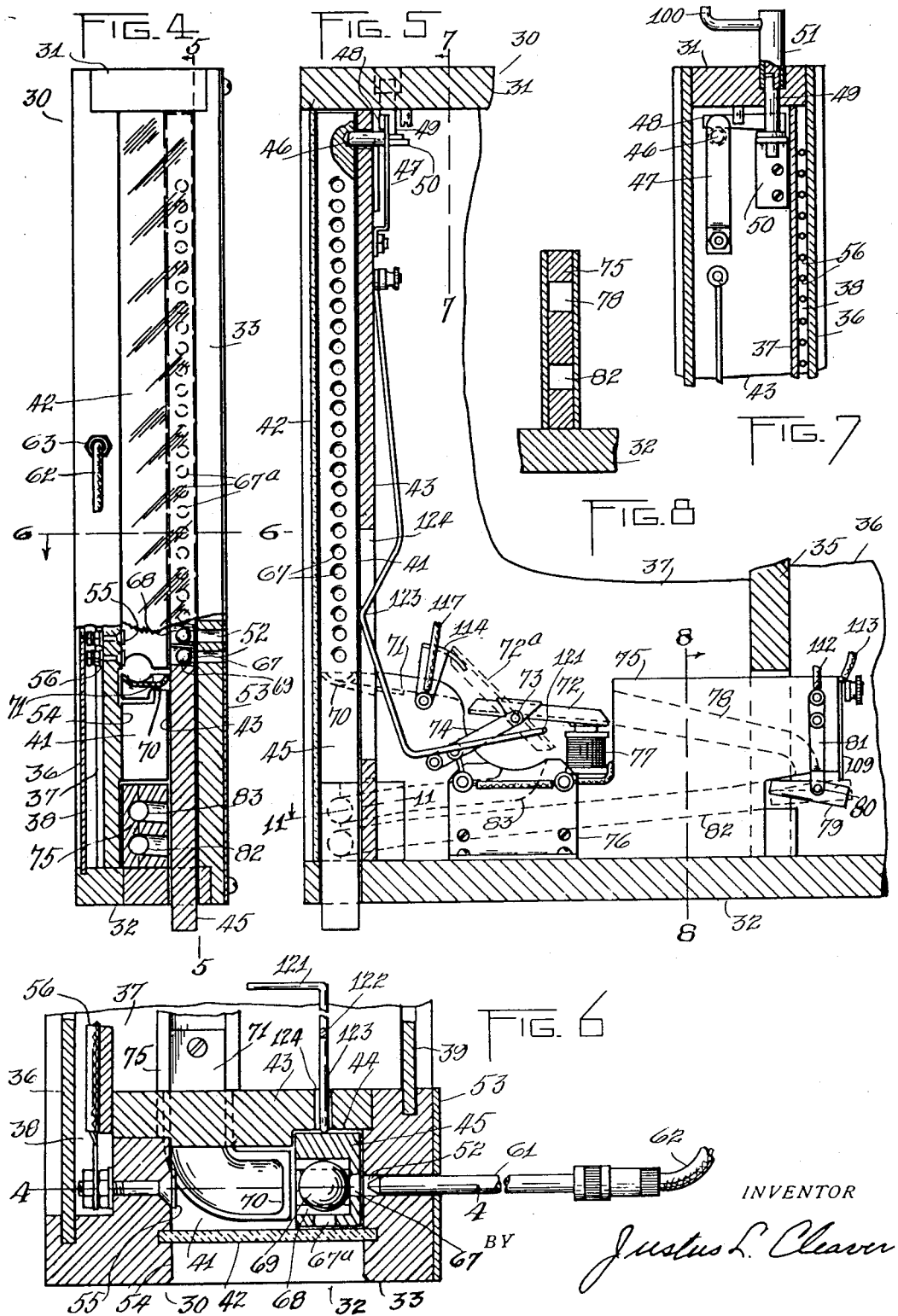

March 6, 1934. J. L. CLEAVER 1,949,783
MENTAL TESTING APPARATUS
Original Filed March 31, 1932   4 Sheets-Sheet 3
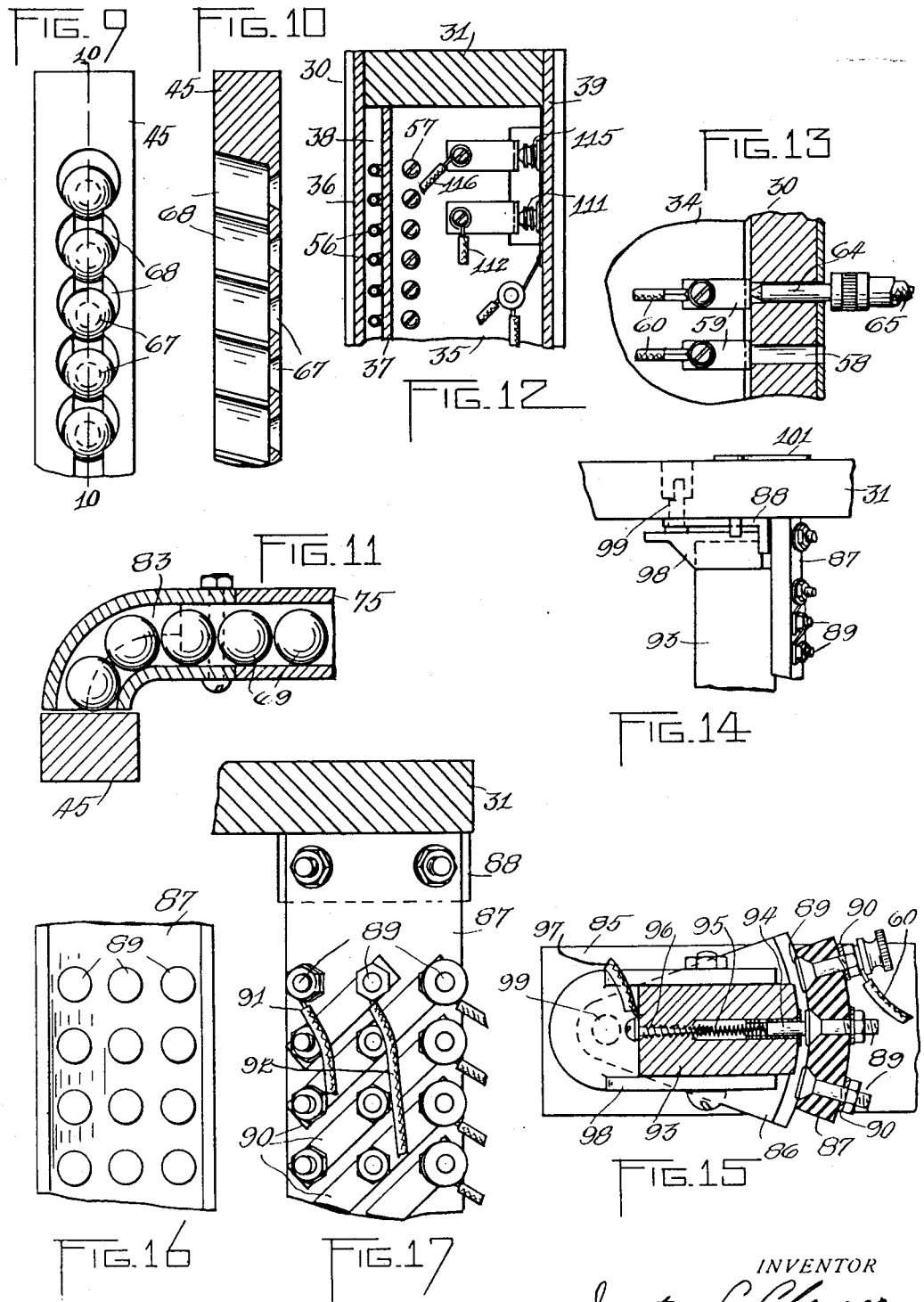
INVENTOR
Justus L. Cleaver March 6, 1934.  J. L. CLEAVER  1,949,783
MENTAL TESTING APPARATUS
Original Filed March 31, 1932  4 Sheets-Sheet 4
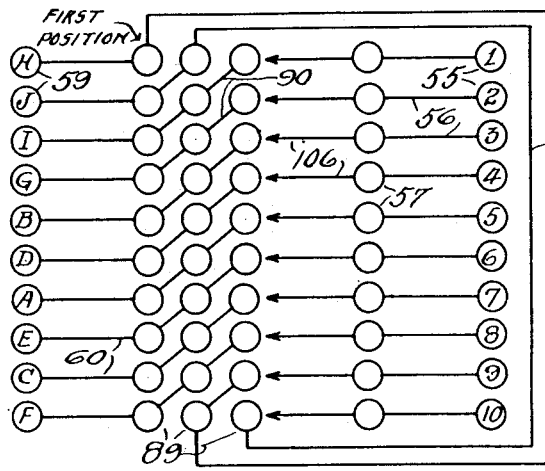
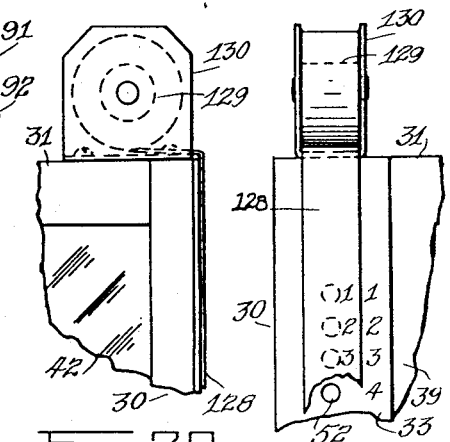
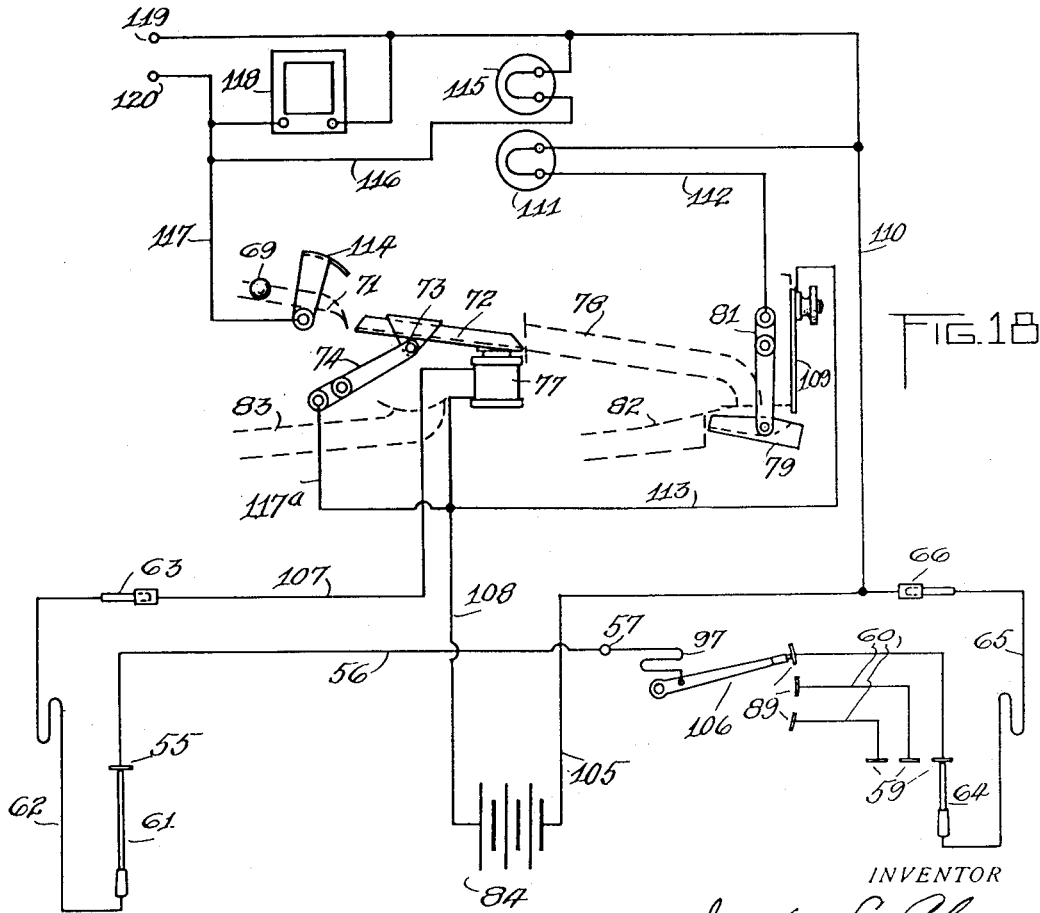
INVENTOR
Justus L. Cleaver Patented Mar. 6, 1934

1,949,783

UNITED STATES PATENT OFFICE 1,949,783

MENTAL TESTING APPARATUS

Justus L. Cleaver, Avon, N. Y.

Application March 31, 1932, Serial No. 602,239
Renewed August 18, 1933

10 Claims. (Cl. 35—12)

The present invention relates to an electro-mechanical apparatus for testing mental achievement and although it is intended primarily to be used by teachers of school shop subjects it may be adapted to various fields and forms of education and amusement.

Devices of an intellectual nature both for educational and for amusement purposes have heretofore been suggested but whereas the operation of such prior devices requires no definite degree of development or preparation on the part of the operator and permits improvement through operation of the device the satisfactory operation of my device requires a definite degree of development or preparation on the part of the operator which cannot be obtained or improved through operation of the device.

The primary purpose of the present invention is to examine or to test an examinee's knowledge of a definite unit of instruction or of a group of related facts. This object is attained by means of the apparatus to be hereinafter more fully described, which while embodying certain known features of construction and operation employed in prior educational or instructional devices, functions as an examiner and not primarily as a teacher. In its operation my invention tests the degree of mental development of an examinee, in regard to the subject of the examination, at the time the examination is begun and it precludes the examinee from acquiring further direct information through conjectural attempts.

It is therefore an object of the invention to eliminate guesswork on the part of the examinee by preventing him from making repeated conjectural, haphazard or experimental attempts to obtain the correct answer to any question proposed.

This object is attained by automatic means which place beyond the further control of the examinee an action initiated by said examinee in attempting to answer any question. In other words, such action when once initiated is thereafter beyond the manual control of the examinee and cannot be revoked. Means are also provided to prevent continuation of the examination, in the event of an incorrect answer, by precluding further successful operation of the apparatus until the operative mechanism has been reset.

A further object of the invention is to thwart any attempt on the part of an examinee to succeed through memorizing the relative positions of questions and their corresponding answers. This is done by providing means to enable the examiner to change the correspondence between designated questions and designated answers as will be hereinafter more fully pointed out and described.

Still another object of the invention is permanently to record, preferably on a strip of paper, each and every attempt of an examinee to answer the questions in any given test.

A still further object is to increase the efficiency and economize the time of both the examiner and the examinee. To this end the apparatus has been made as simple as possible in construction, attractive in appearance, easy and interesting to manipulate without requiring constant supervision on the part of the examiner or person conducting the test, and adequately protected against fraudulent manipulation and against derangement through idle or mischievous tampering. Means are also provided to enable the examiner to see a portion of the interior construction in order to observe the condition of the actuating means and to view the operation of resetting the actuating mechanism. Signals, which are optionally audible or visible, enable the examiner even at a distance to note the progress of the test. Optional means are also provided whereby an amusing or dramatic sequence may be caused to occur in conjunction with a signal which denotes the unsuccessful termination of the test. This serves to inculcate care and thoughtfulness on the part of the pupil in preparing for a test and, as an examinee, in answering the questions proposed and further increases the adaptability of the apparatus for use as an amusement device.

Other features and advantages of the invention will become apparent during the course of the following description when taken in connection with the accompanying drawings which illustrate the invention and form a part of the specification, and in which:

Fig. 1 is a partial top plan view of the apparatus and a partial sectional view on the line 1—1 of Fig. 2;

Fig. 2 is a front elevation of the apparatus with parts broken away to show portions of the interior mechanism;

Fig. 3 is a fragmentary view similar to Fig. 2 of the upper part of the apparatus, but showing a modification of the invention as will be explained;

Fig. 4 is an enlarged side elevation as viewed from the left, with respect to Fig. 2, the lower portion being shown in section as on the line 4—4 of Fig. 6;

Fig. 5 is a fragmentary sectional view on the line 5—5 of Fig. 4;

Fig. 6 is a fragmentary sectional view on the line 6—6 of Fig. 4 but drawn to a larger scale;

Fig. 7 is a sectional view on the line 7—7 of Fig. 5, this view also showing the removable key for releasing the magazine locking means;

Fig. 8 is a sectional detail on the line 8—8 of Fig. 5;

Fig. 9 is a rear face view of the upper portion of the ball retaining member or magazine;

Fig. 10 is a sectional view on the line 10—10 of Fig. 9;

Fig. 11 is an enlarged sectional view on the line 11—11 of Fig. 5;

Fig. 12 is a sectional view on the line 12—12 of Fig. 2;

Fig. 13 is a sectional detail on the line 13—13 of Fig. 2;

Fig. 14 is a detail view in elevation of the upper part of the controller and parts associated therewith, as viewed from the front of the apparatus;

Fig. 15 is an enlarged sectional view through the controller and parts associated therewith, as taken on the line 15—15 of Fig. 2;

Fig. 16 is an inner face view of a portion of the controller panel;

Fig. 17 is an outer face view of the upper portion of the controller panel;

Fig. 18 is a diagram of the circuit connections;

Fig. 19 is a further diagrammatic view showing portions of the circuit connections as will be explained;

Fig. 20 is a view from the left, with respect to Fig. 2, of the upper left hand corner of the apparatus, showing in side elevation a roll holder and roll of paper mounted therein, the purpose of which will be explained; and Fig. 21 is a view in front elevation of the parts seen in Fig. 20.

In the drawings, similar reference numerals refer to similar parts throughout the several views.

The automatically operable mechanism, electrical devices and wiring of the apparatus are contained within a cabinet, preferably of wood or other insulating material, comprising in this instance, a rectangular frame 30; the top, bottom, left and right hand sides of which are indicated by the numerals 31, 32, 33, and 34 respectively; a vertically arranged central partition 35; a back guided for sliding movement in the sides of the frame; an inner wall 37 adjacent the back and extending from the side 33 to the partition 35 to form a shallow chamber 38; and a front consisting of two removable panels 39 and 40 supported upon the bottom 32 and guided for vertical movement in the partition and their respective sides of the frame.

In the side 33 and extending from top to bottom thereof is an outwardly opening chamber 41 the open side of which is closed by a removable glass providing a sight window 42, while the inner wall 43 of such chamber adjacent the front wall is channelled at 44 (Fig. 6) to provide a guideway for a slidable bar 45 which projects through an opening in the frame bottom 32, such bar being releasably held against downward movement by any suitable locking means, in this instance the bar adjacent its upper end having a lateral opening for receiving a pin 46 (Fig. 5) carried by a spring arm 47 and extending through an opening in the wall 43, the pin or detent being moved out of locking engagement to permit lowering of the member 45 by a swinging arm 48 which engages the inner face of the spring arm and is carried by a stud 49 rotatably mounted in a bracket 50 and extending upwardly part way through an opening in the top 31, its upper end being formed for clutching engagement with an operating key 51.

In the side 33 of the cabinet frame is a series of vertically arranged openings indicated generally by the number 52. There may be any number of these openings, in this instance twenty-five being shown and consecutively numbered, the indicia preferably being etched on a perforated metal plate 53 secured to the front face of the frame-part 33. In the rear wall 54 of the chamber 41 is a row of terminals 55, there being a terminal in axial alignment with each opening 52, such terminals, in this instance, comprising the heads of threaded studs which provide binding posts for wires 56. These wires 56 are horizontally arranged within the shallow chamber 38 and are also connected to respective binding posts 57 comprising a series of twenty-five, in this instance, arranged on the right hand face of the partition wall 35.

In the side 34 of the cabinet is a series of aligned openings 58 corresponding in number to the openings 52 and lettered, in this instance, A to Y inclusive. At the inner end of each such opening is a terminal member, that shown in the drawings, Fig. 13, being the laterally turned end of a metallic strip 59 secured to the inner face of the side 34 and providing a terminal for one end of a flexible wire 60.

For the purpose of making an electrical connection at any selected one of the terminals 55 a test prod 61 (Fig. 2) is provided, such member being carried by a flexible cable 62 on the other end of which is one member of a separable connector 63, the other end of the separable connector comprising an insert in the side of the cabinet. For making electrical connection with any one of the terminals 59 there is a test prod 64 carried by a cable 65 which, at its other end, is fastened to one member of a separable connector 66, the other member of which is an insert in the side 34 of the cabinet.

The bar 45, it will be observed, has a series of openings 67 which, when the bar is in its uppermost position, are axially aligned with respective openings 52 and, like the latter, are of such diameter as to slidably receive the test prod 61. Each opening terminates in a compartment 68 adapted to receive a ball 69, these compartments, at least the ball-supporting surfaces thereof being inclined to prevent accidental displacement of the balls while permitting their ejection by the prod 61. (See Figs. 9 and 10.)

As hereinbefore state, an object of the invention is attained by causing the examinee in answering a question to initiate an action thereafter automatic and out of manual control. To aid in the accomplishment of this purpose the bar 45 which, it will be observed, comprises a magazine for the balls, has been devised, its function and that of the mechanism associated therewith being as follows:

The magazine 45, with a ball 69 in each of its compartments, is normally held in its uppermost position by the spring actuated detent 46. When the test prod 61 is inserted in a selected one of the openings 52 and pushed through the aligned opening 67 in the magazine and on through the compartment 68 into contact with the respective terminal 55, the ball 69 in such compartment is dislodged and falls by gravity into the lateral extension 70 of an inclined trough 71 from which it rolls onto a channeled trip member 72 comprising a lever pivoted at 73 on a pair of arms 74 anchored to and projecting from the sides of a supporting member 75 which by means of screws in an attached bracket 76 is secured to the bottom 32 of the cabinet (as shown in Fig. 5). This supporting member 75 and the several parts carried thereby I refer to as a "selector" because of its general function. The long arm of the lever or trip 72, which is composed wholly or in part of magnetic material, forms the armature of an electromagnet 77 which, as will be hereinafter explained, is energized by current from the battery 84 if the test prod 64 is in contact with a terminal 59 and the test prod 61 is simultaneously in contact with a terminal 55 and the two selected terminals simultaneously contacted form an electrically inter-connected pair. In this event the ball rolls over the lever member into a channel 78 from which it is discharged onto a second trip member 79 having electrical connection through its pivotal support 80 to the supporting arms 81 in which the pivot is mounted. The last named trip member is tripped by the weight of the ball which is discharged therefrom and starts rolling through an inclined discharge channel 82 which opens in a lateral bend against the rear face of the magazine 45 at a point below the lowermost compartment 68. Should the two selected terminals, simultaneously contacted by the test prods, happen to be other than an electrically interconnected pair, the magnet 77 is not energized and the weight of the ball operates to trip the lever 72 and effect a discharge of the ball into a discharge channel 83 formed parallel with the channel 82 in the support 75 and also opening in a lateral bend against the rear face of the magazine below the lowermost compartment 68. The lever 72 after being tripped remains in its tripped position and inoperable in any way by either a ball or magnet, the effect being to discharge any further balls dislodged by prodding action into the channel reserved for balls associated with unsuccessful attempts of the examinee. The lever 72 is adapted to be returned to its operative position by means of a resetting device as will be pointed out.

It will be observed that the selector functions to permit or to stop the continuation of the test in the event of right or a wrong answer, respectively, and that other means might be employed to accomplish the same result. For example, the magnet 77 might be energized by a normally closed circuit which would be unaffected by a right answer but which would be opened or shunted by a wrong answer; or the designated terminals might be so arranged as to be inaccessible or inoperable for contact in the event of a wrong answer. However I prefer to employ the means shown and described.

To replace any one or all of the balls from the channels 82 and 83 in the magazine 45, the operator places one hand under the magazine as a support therefor and then by the key 51 releases the detent 46. As the magazine slides downwardly the ball or balls in either or both of the channels 82 and 83 will, in succession, roll into the empty compartments 68 as the latter pass the discharge ends of such channels. Sight openings 67a in the outer side wall of the magazine 45 permit the operator by looking through the glass 42 to see from which compartment balls have been displaced and to witness the replacement therein of the balls from the discharge channels 82 and 83.
When completely loaded the magazine is again shoved upward and engaged by the locking member 46. For the purpose of resetting the trip lever 72 at the same time that the magazine 45 is reloaded the short arm of the trip lever is adapted to be engaged on its under side by a lateral extension 121 of the substantially L shaped spring wire 122 which at its upper end is anchored to the wall 43 of the cabinet. An outward bend 123 in the long arm of the spring member engaging through a slot in the wall 43 bears against the inner side face of the magazine 45 while the magazine is in its operating position and, by its lateral spring action, rides off the end of the magazine as the magazine nears its lowermost reloading position, whereupon the extension 121 engages the lever 72 and returns it to an approximately vertical position from which point it is returned by gravity to its normal operating position as shown in full lines in Fig. 5. As the magazine is moved upward the spring 122 is returned under lateral stress to its non-operative position.

As a source of electric power I use, in this instance, a battery as shown at 84 in Fig. 2 although other sources of electric power may be used, such as transformers, without departing from the spirit and scope of the invention. At the rear of the battery is a block 85 upon which is secured a plate 86 having a flange to which is bolted the lower end of a vertically extending segmental controller panel 87 of electrical insulating material, the upper end thereof being similarly secured to the downwardly turned segmental flange on a plate 88 attached to the under face of the cabinet top 31 (Fig. 14). Extending through this controller panel are a plurality, in this instance three, of vertically arranged rows of studs 89, each row having the same number of studs as there are terminals 59, the heads of the studs providing electrical contacts on the inner face of the panel while the outer ends thereof provide binding posts for electrical connections (Figs. 15, 16 and 17). To the posts 89 in one row are connected the wires 60 leading from corresponding terminals 59. The three rows of contact studs on the panel are, in this instance, arranged in groups of ten, ten and five the purpose of which will be hereinafter explained. In each group the studs in the first row marked "first position", to which the wires 60 are connected are, with the exception of the upper two, electrically connected with the diagonally aligned studs in the other rows, the first or uppermost one being connected by an insulated wire 91 with the last or lowermost one of the second row, while the second one from the top is connected by a strip 90 to the top one of the second row and thence by wire 92 to the lowermost one of the third row, these connections being illustrated diagrammatically in Fig. 19.

Cooperating with the panel 87 is a controller arm 93 in which is a vertically arranged row of yielding contact pins or plungers 94, each of which, see Fig. 15, has electrical connection through the medium of a compression spring 95 with a screw 96 under the head of which is secured one end of a flexible connection 97, the other end thereof being connected to a respective wire 56 through a binding post 57 on the frame member 35. The controller arm 93 is provided with end pieces 98, and by studs 99 in such end pieces is mounted to turn about a vertical axis so as to bring the row of spring plungers 94 into contact with any one row of contacts in the panel 87. The lower stud turns in the block 85 while the upper stud turns in the top of the cabinet and extends into a counterbore into which an operating key 51 is received. The same key 51 may be used to set the controller arm and release the magazine 45, it being formed, preferably, with an indicator portion 100 which, when the key is used for turning the controller arm, cooperates with an index plate 101 (Figs. 1 and 2).

Operation of the apparatus is as follows: The questions and answers, of which there may be any number within the limits of the number of question and answer terminals, are preferably placed on separate sheets, in this instance the questions arranged in numerical order being upon a sheet 102 detachably held by any suitable means, such as the spring clips 103, to the front face of the panel 39. The answer sheet 104 preferably is divided into as many spaces as there are answers, each space containing an answer, and the spaces lettered in alphabetical order, this sheet being attached by clips 103 or the like to the front panel 40. It will be, of course, understood that the answer for a given question occupies a space bearing the same letter as that designating the terminal 59 in electrical connection with the question terminal 55. Because of the provision made for inter-changing the connections between question and answer terminals there may be a plurality of answer sheets for each sheet of questions, the answers on one sheet being arranged differently from those on another. Therefore the answer sheets have a code marking as an indication to the person in charge of apparatus of a proper setting of the controller arm, the position of the controller arm being unknown to the examinee since the key 51 is removable and no other visible indication is provided. The questions are, preferably, in multiples of five for convenience in calculating per cent standings and arranged in groups of ten, ten and five, the first ten questions having their answers associated with the first ten letters, the second ten questions having their answers associated with the second ten letters and the last five questions having their answers associated with the last five letters. It may be stated that there is also a transposition of the wires 60 connecting the terminals 59 with the terminals 89 on the controller panel, see Fig. 19, in order that the answer to question number 1 for instance will not be at the otherwise expected terminal A, B or C but will be, in this instance, at H, J or I depending on the setting of the controller arm 93.

The examinee, with a test prod in each hand, selects a question to which he thinks he knows the answer, thrusts the test prod 64 into one of the holes 58 having the letter corresponding to the selected answer and then thrusts the test prod 61 into the hole of the series which has the same number as the question selected. The test prods being thrust in to their limits make contact with their respective terminals 59 and 55 and if the correct answer is selected to the chosen question a circuit is established as follows (Fig. 18): from battery 84 through wire 105, connector 66, cable 65, test prod 64, one of three terminals 59 (according to the setting of the controller) and its wire connection 60, a contact 89 in one or another of the three rows of such contacts on the controller panel 87, controller plunger, spring and terminal screw which is indicated generally by the numeral 106, connection 97, wire 56, terminal 57, question terminal 55, test prod 61, cable 62, connector 63, wire 107 to the coil of the electromagnet 77 and wire 108 to the other side of the battery 84. Energizing of the coil 77 attracts the armature comprising the long arm of the trip lever 72 and holds such member in position to form an intermediate section between the trough 71 and the channel 78.

The test prod 61 when thrust through the opening 52 against the terminal 55, prior to making such contact, dislodges the ball 69 in line therewith from its compartment 68 in the magazine 45, such ball dropping by gravity onto the lateral extension 70 of the trough 71 and continuing to roll along such trough and over the trip 72 into the channel 78. As the ball leaves the channel 78 it drops onto the weighted trip 79 and effects a throw of the latter into contact with a terminal piece 109. From the trip 79, which when the ball leaves it automatically returns to open circuit position, the ball is discharged into the discharge channel 82 which, as hereinbefore stated, opens at its discharge end against the inner face of the magazine 45. The contact of the trip 79 with the terminal piece 109 momentarily causes a circuit to be established from the battery 84, through wire 105, wire 110, signal lamp 111, switch supporting arm 81, switch 79, terminal piece 109, wire 113, wire 108 and back to the battery 84. Said signal lamp is shown as mounted on the partition 35 and is provided with a lens of any desired color as green. The effect is that when the correct answer is selected to a chosen question a colored light is flashed.

Should the wrong answer be selected to a chosen question the magnet 77 would not become energized and the ball rolling onto the short arm of the trip lever 72 would throw such member to the position shown at 72a, (Fig. 5) and against a terminal piece 114, the ball being diverted into the discharge channel 83. A circuit would be established as follows: from battery 84, through wire 105, wire 110, lamp 115, wire 116, wire 117, contact member 114, trip 72, trip supporting arm 74, wire 117a, wire 108 to battery 84. The lamp 115 is supported on the partition 35 adjacent the lamp 111 and is provided with a lens of any desired color as red, the lamp remaining lighted until the trip member 72 is reset. As hereinbefore stated a feature of the invention is the provision of an amusing or dramatic sequence to follow an unsuccessful termination of a test. This comprises in the present instance a buzzer 118 such as is commonly used in electrical communication which is placed in parallel circuit with the lamp 115 and operates to give an audible alarm in the event of an unsuccessful attempt on the part of an examinee to answer a question. Also in parallel circuit to the lamp 115 are connected terminals 119 and 120 to facilitate optional connection by the examiner of any electrically operable supplementary signaling device that his ingenuity and fancy may suggest.

In Fig. 3 there is shown a modification of the invention in which the questions for different tests are on a roll 125 carried by a roller 126 removably mounted in brackets 127 secured to the panel 39. Likewise the answers for such tests would be on a roll not shown, carried by a roller 126 removably mounted in brackets 127 secured to the panel 40.

To the end that a permanent record may be kept of mental tests applied by means of the apparatus, a strip of thin material such as paper may be placed over the row of question openings 52 the position of the several openings being indicated on the strip and such indications numbered in accordance with the numbering of the holes 52. As a question is selected the test prod punctures the paper opposite the number of the question. Should a wrong answer be selected a check mark is made on the strip by the examinee to indicate the question on which he failed. The strips are attached to the face of the cabinet in front of the row of openings 52 by any suitable fastening devices such as thumb tacks or spring clips, not shown. Preferably the strips form a continuous roll 128 on a roller 129 removably mounted in a U-shaped bracket 130 secured to the top of the cabinet (Figs. 20 and 21).

I have found that in order to prevent an examinee from experimentally manipulating a mental testing apparatus and thereby attaining a spurious mental rating, some means must be provided whereby the first attempt at answering a question shall be the final attempt at that particular question during that particular application of the test being undertaken. In other words, his every attempt to answer a question by means of the apparatus must initiate an irrevocable action which must carry through to a decisive result influenced entirely by the forethought of the examinee and not by his afterthought. To provide means for initiating this irrevocable action it is necessary to utilize some form of potential energy, the release and expenditure of which constitutes the necessary irrevocable action. This I have done, as hereinbefore pointed out in different words, by providing a means for placing a series of balls in such position that one will be dislodged at any attempt of an examinee to answer any question and in its subsequent downward course the gravitational effect of the ball furnishes power to cooperate with a source of electrical power to actuate certain signaling devices as above described. Although the means employed in the above described preferred embodiment of my invention to supply and utilize stored-up potential energy resides in the use of a ball placed in, and subsequently discharged from, an elevated position it will be obvious to one skilled in the art that other means may be employed to produce the same result.

I have also found it advantageous to extend the interval of time and delay the ultimate result of the action thus initiated in order to allow an examinee enough time to complete the intended manual action which is, in this instance, to make a contact of the test prod 61 with the terminal 55 initially blockaded by the ball 69. It will be observed that each ball 69 is dislodged from its respective compartment 68 prior to the test prod 61 making contact with the terminal 55. The magnet 77 however does not become energized until such contact is made. Therefore, to make sure of a positive connection of the test prod with the contact in advance of the arrival of the ball at the trip lever 72, a delay in the initial travel of the ball is provided, in this instance, through the medium of the bend in the ball receiving trough 71 and in the relatively slight incline of the trough. Although the means employed, to provide a delayed action, as above described, resides in the use of a trough adapted to retard the travel of the ball, it is to be understood that I do not wish to be limited thereto since other means may be employed to produce the same result, such as for example an escapement to retard a spring action, or a constricted passage for the escape of confined gas, or a frictional brake on moving mechanism or a dash-pot to retard the plunger of a solenoid.

In order to indicate that the full number of questions have been successfully answered, the discharge channel 82 is made of such length that if all the balls 69 are discharged into it, the last ball will remain on the trip member 79 because of lack of space in channel 82 to accommodate it. In this event the trip member 79 will be held into contact with the terminal member 109, causing signal lamp 111 to light, as hereinbefore pointed out, and said lamp will remain lighted until the last ball is discharged from trip member 79 into the discharge channel 82 during the reloading of the magazine 45 as hereinbefore described.

While in the foregoing there has been shown and described the preferred embodiment of my invention, it is to be understood that minor changes in the details of construction, combination and arrangement of parts may be resorted to without departing from the spirit and scope of the invention as claimed.

What I claim is:

1. A mental testing apparatus including two series of electric terminals, each terminal of one series having connection with a terminal of the second series, a manually operable means for making electrical contact with a selected terminal of the first series, a ball supported adjacent each terminal of the second series, a manually operable means for making electrical contact with a selected terminal of the second series and for independently dislodging the ball adjacent the selected terminal during its movement into contact therewith, an inclined channel for receiving said balls, passages communicating with the channel, a selector in said channel adapted to direct a ball into any one of said passages.

2. A mental testing apparatus including two series of terminals corresponding to questions and answers, each terminal of one series being interconnected with a terminal of the second series, a manually operable means for making electrical connection with a selected terminal of the first series, a ball adjacent each terminal of the second series, a chamber, a magazine for supporting the balls in compartments opening into said chamber, a manually operable means for contacting the terminals adjacent said balls and for independently dislodging the balls into said chamber, an inclined receiving channel adapted to receive said balls when dislodged from said compartments, an intermediate section of said channel comprising a lever composed at least partly of magnetic material and pivoted intermediate its ends, two discharge channels opening at their discharge ends against a face of said magazine, a plurality of signals such as electric lamps, an electro-magnet adapted to hold said lever against movement whenever a circuit is established by said contact members with two inter-connected terminals, an automatically operable switch adapted for closing a circuit through another of said signals as an indication that a ball has been dislodged and that simultaneous contacts have not been made by said contact members with two inter-connected terminals, an automatically operable means for tripping said lever and throwing it into electrical contact with a terminal member and means for resetting said lever.

3. A mental testing apparatus including two series of electric terminals, each terminal of one series being interconnected with a terminal of the second series, a manually operable means for making electrical connection with a selected terminal of the first series, a ball adjacent each terminal of the second series, a chamber, a magazine for supporting the balls in compartments opening into said chamber, a manually operable means for contacting the terminals adjacent said balls and for independently dislodging the balls one at a time into said chamber, an inclined receiving channel adapted to receive said balls when dislodged from said compartments, two discharge channels opening at their discharge ends against said magazine in line with but below said compartments, a rotatable lever comprising an intermediate section of said receiving channel, an electro-magnet adapted when energized to overcome the weight of a ball on the lever and hold the latter against rotating, a second lever at the lower end of said receiving channel adapted to be tripped by a ball, the first named lever being adapted to be rotated by a ball when the electro-magnet is not energized, said levers comprising in combination with a terminal member a signal operating switch.

4. A mental testing apparatus which includes a cabinet bearing electric terminals corresponding to questions and answers, open electric circuits between each question terminal and its corresponding answer terminal, means for closing any one of said open circuits and by the same action releasing a ball, a channel to receive the ball, a switch adapted to be closed by said ball during its passage through the channel, an electric signaling mechanism in circuit with the switch and a selector to deflect the ball from the channel, said selector being electrically connected to all of said open circuits between the question and answer terminals.

5. A mental testing apparatus which includes a cabinet bearing electric terminals corresponding to questions and answers, open electric circuits between each question terminal and its corresponding answer terminal, means for closing any one of said open circuits and by the same action releasing a ball, a channel to receive the ball, a switch adapted to be closed by the ball during its passage through the channel, an electric signaling mechanism in circuit with the switch and a selector to deflect the ball from the channel, said selector being electrically connected to all of said open circuits between the question and answer terminals and said ball-receiving channel being adapted to retard the ball in its travel therethrough.

6. A mental testing apparatus which includes a cabinet bearing concealed electric terminals coresponding to questions and answers, open electric circuits between each question terminal and its corresponding answer terminal, means for closing any one of said open circuits and by the same action releasing a ball, a channel to receive the ball, a switch adapted to be closed by the ball during its passage through the channel, an electric signalling mechanism in circuit with the switch and a selector to deflect the ball from the channel, said selector being electrically connected to all of said open circuits between the question and answer terminals and said ball-receiving channel being adapted to retard the ball in its travel therethrough.

7. A mental testing apparatus which includes a cabinet bearing questions and answers, two series of terminals related thereto, each terminal of one series being electrically connected with a terminal of the other series, manually operable means for contacting and closing an electrical circuit between a terminal of one series and a terminal of the other series and a manually operable means for simultaneously disconnecting the two series of terminals and simultaneously reconnecting them in a different order.

8. A mental testing apparatus which includes a cabinet bearing questions and answers, two series of terminals related thereto, each terminal of one series being connected with a terminal of the other series, manually operable means for contacting and closing an electrical circuit between a terminal of one series and a terminal of the other series, a selector including signal switches and an electro-magnet adapted to be put into circuit with the terminals so contacted, a movable controller arm bearing a row of contacts each contact being electrically connected to a terminal of one of said series of terminals, a controller panel adjacent the controller arm and having a plurality of rows of contacts there being electrical connections between the contacts of each individual row of contacts and the terminals of the other of said series of terminals, said controller arm being adapted to be concealably operated.

9. A mental testing apparatus which includes a cabinet bearing electric terminals corresponding to questions and answers, open electric circuits between each question terminal and its corresponding answer terminal, means for closing any one of said open circuits and by the same action releasing a ball, a channel to receive the ball, a switch adapted to be closed by said ball during its passage through the channel, an electric signalling mechanism in circuit with the switch and a selector to deflect the ball from the channel, said selector being electrically connected to all of said open circuits between the question and answer terminals, and a manually operable means for simultaneously disconnecting the circuits between question and answer terminals and simultaneously reconnecting them in a different order.

10. A mental testing apparatus which includes a cabinet bearing two series of electric terminals corresponding to questions and answers, open electric circuits between each question terminal and its corresponding answer terminal, a chamber in the cabinet having a plurality of aligned openings extending through a wall thereof and coinciding with one of said series of terminals, a magazine guided for reciprocating movement in said chamber, means for lowering and raising the magazine through the bottom of said chamber with releasable and concealed means for locking the magazine in its uppermost position, the magazine having holes through a wall thereof which when the magazine is in its uppermost position are axially aligned with respective openings in said cabinet, compartments communicating with said holes and with said chamber, balls in the compartments, a prod adapted to eject said balls one at a time from said compartment and at the same time to contact said terminals aligned therewith, means for guiding the balls back into said compartments when the magazine is lowered, a sight aperture in each of said compartments, a window of transparent material in a wall of said chamber adjacent the magazine, a second prod for contacting the other series of terminals, said open circuits adapted to be closed by said prods, a channel to receive the ejected balls, a switch adapted to be closed by a ball during its passage through the channel, an electric signaling mechanism in circuit with the switch and a selector to deflect the ball from the channel, said selector being electrically connected to all of said open circuits between the question and answer terminals.

JUSTUS L. CLEAVER.